US010873884B2

(12) United States Patent
Donepudi et al.

(10) Patent No.: US 10,873,884 B2
(45) Date of Patent: Dec. 22, 2020

(54) CELL ID DISAMBIGUATION

(71) Applicant: Parallel Wireless, Inc., Nashua, NH (US)

(72) Inventors: Sridhar Donepudi, Nashua, NH (US); Rajesh Kumar Mishra, Westford, MA (US); Kaitki Agarwal, Westford, MA (US); Yang Cao, Westford, MA (US); Zeev Lubenski, North Andover, MA (US); Murali Talluri, Shirley, MA (US)

(73) Assignee: Parallel Wireless, Inc., Nashua, NH (US)

(*) Notice: Subject to any disclaimer, the term of this patent is extended or adjusted under 35 U.S.C. 154(b) by 0 days.

(21) Appl. No.: 16/237,191

(22) Filed: Dec. 31, 2018

(65) Prior Publication Data
US 2019/0182725 A1    Jun. 13, 2019

Related U.S. Application Data

(63) Continuation of application No. 15/241,060, filed on Aug. 18, 2016.

(60) Provisional application No. 62/206,666, filed on Aug. 18, 2015.

(51) Int. Cl.
| H04W 36/00 | (2009.01) |
| H04W 76/11 | (2018.01) |
| H04W 4/02 | (2018.01) |
| H04W 4/029 | (2018.01) |
| H04W 64/00 | (2009.01) |

(52) U.S. Cl.
CPC ....... *H04W 36/0061* (2013.01); *H04W 4/026* (2013.01); *H04W 4/029* (2018.02); *H04W 36/0083* (2013.01); *H04W 36/00835* (2018.08); *H04W 76/11* (2018.02); *H04W 64/003* (2013.01)

(58) Field of Classification Search
CPC ....... H04W 36/0061; H04W 36/00835; H04W 76/11; H04W 4/029; H04W 36/0083; H04W 4/026; H04W 64/003
See application file for complete search history.

(56) References Cited

U.S. PATENT DOCUMENTS

| 8,179,860 | B2 * | 5/2012 | Brusilovsky .... H04W 12/04033 370/331 |
| 2008/0311927 | A1 | 12/2008 | Boman et al. |
| 2011/0053591 | A1 | 3/2011 | Kubo et al. |
| 2011/0070897 | A1 * | 3/2011 | Tang ................. H04W 24/02 455/456.1 |
| 2012/0315956 | A1 | 12/2012 | Mochida et al. |
| 2013/0040683 | A1 * | 2/2013 | Siomina ............ H04W 28/0236 455/517 |
| 2014/0073304 | A1 * | 3/2014 | Brisebois ............. H04W 24/02 455/418 |

(Continued)

*Primary Examiner* — Shailendra Kumar
(74) *Attorney, Agent, or Firm* — Michael Y. Saji; David W. Rouille (57) ABSTRACT

Systems and methods for cell ID disambiguation are described. In one embodiment, a method may be disclosed for constructing a neighbor table, comprising: receiving, at a mobile base station, a physical cell identifier (PCI) of a detected neighbor base station from a user equipment (UE); receiving a global positioning system (GPS) position of the mobile base station; and associating the GPS position of the mobile base station with the PCI of the detected neighbor base station in a neighbor table.

10 Claims, 5 Drawing Sheets

(56) References Cited

U.S. PATENT DOCUMENTS

2014/0073306 A1\*  3/2014  Shetty ............... H04W 36/0088
                                                    455/418
2017/0347272 A1\*  11/2017  Ahmavaara ........... H04W 16/14
2018/0167854 A1\*  6/2018  Enomoto .......... H04W 36/0033

\* cited by examiner

FIG. 1

| PCI 201 | SCTP 202 | | ECGI 203 | GPS (Coords) 204 |
| --- | --- | --- | --- | --- |
| | IP 202a | Port 202b | | |
| 1 | 10.0.0.1.0 | 36412 | 0 | x, y |
| 1 | 10.0.0.1.1 | 36412 | 1 | x', y' |
| 2 | 10.0.0.1.2 | 36412 | 3 | x'', y'' |
| 3 | 10.0.0.1.3 | 36412 | 4 | x''', y''' |

FIG. 3
Pre Release 9 Handin Procedure (PCI conflict) – RUA Connect Forking)

CELL ID DISAMBIGUATION

CROSS-REFERENCE TO RELATED APPLICATIONS

This application is a continuation of, and claims the benefit of an earlier filing date under 35 U.S.C. § 120 based on, U.S. patent application Ser. No. 15/241,060, filed Aug. 18, 2016, and entitled "Cell ID Disambiguation", which itself claims the benefit of priority under 35 U.S.C. § 119(e) to U.S. Provisional Pat. App. No. 62/206,666, filed Aug. 18, 2015 with title "Cell ID Disambiguation," which are each hereby incorporated by reference in their entirety for all purposes. As well, U.S. Pat. No. 8,867,418 and U.S. Pat. App. No. 20140133456 are also hereby incorporated by reference in their entireties.

BACKGROUND

A UE (user equipment) or other mobile device that attaches to a nearby cell will obtain a primary sync signal and a secondary sync signal from the cell, which together enable the UE to calculate a physical cell identity (PCI). There are 504 different combinations available for the PCI, based on characteristics of the primary and secondary sync signals. A mobile network may include more than 504 cells, but this is typically handled by ensuring that the same PCI is not used for adjacent cells.

When a single PCI is used at the same time by more than one cell or eNodeB, the core network may be unable to unambiguously determine which cell should receive a message directed to a given PCI. This situation may be called PCI confusion or PCI collision, and its solution may be called PCI disambiguation.

SUMMARY

Systems and methods for cell ID disambiguation are described. In one embodiment, a method may be disclosed for constructing a neighbor table, comprising: receiving, at a mobile base station, a physical cell identifier (PCI) of a detected neighbor base station from a user equipment (UE); receiving a global positioning system (GPS) position of the mobile base station; and associating the GPS position of the mobile base station with the PCI of the detected neighbor base station in a neighbor table.

The neighbor table may be an automatic neighbor relation (ANR) table and the base station may be an eNodeB. The ANR table may be constructed and stored at a coordinating node in an operator core network. The method may further comprise estimating, at the coordinating node, using a plurality of stored records, a set of GPS coordinates estimating the position of the neighbor base station. The method may further comprise sharing the ANR table with a plurality of eNodeBs in the network. The method may further comprise receiving, at the mobile base station, a handover request from a UE with an ambiguous PCI; and resolving the ambiguous PCI by retrieving a PCI matching the ambiguous PCI and associated with a current GPS position of the mobile base station. Retrieval of the matching PCI may be performed at a coordinating node in an operator core network.

The method may further comprise requesting, from the mobile base station via the UE, an evolved universal terrestrial radio access cell global identifier (ECGI) of the detected neighbor base station. The method may further comprise receiving, from the UE, the ECGI of the detected neighbor base station; associating the ECGI with the associated mobile base station GPS position and the detected neighbor base station PCI; and retrieving the ECGI based on a subsequent query for a record associated with the mobile base station GPS position and the detected neighbor base station PCI, without subsequently requesting the ECGI.

The method may further comprise receiving, from the UE, a signal strength of the detected neighbor base station. The method may further comprise receiving, from the UE, an internet protocol (IP) address of the detected neighbor base station. The method may further comprise receiving, from the UE, a stream control transmission protocol (SCTP) address further comprising an Internet protocol (IP) address and a port for delivering a particular service of the detected neighbor base station. The method may further comprise storing the IP address and the port in a domain name system (DNS) service (SRV) record. The method may further comprise associating a timestamp with the associated mobile base station GPS position and the detected neighbor base station PCI.

In another embodiment, a method may be disclosed for resolving an ambiguous physical cell identifier (PCI) received as part of a handover request, comprising: receiving an original handover request at a coordinating node; identifying, at the coordinating node, a plurality of base stations corresponding to the PCI value in the handover request; and sending, from the coordinating node, to each of the plurality of base stations, a handover request based on the original handover request. The handover request may be received from a source eNodeB and the coordinating node may be a node in an operator core network.

DETAILED DESCRIPTION

In a typical macro cell deployment, physical cell IDs (PCIs) are carefully preallocated by the wireless operator. Although PCIs are sometimes reused, the operator ensures that no two adjacent cells have the same PCI, so that when a UE passes through a cell edge boundary, it is clear based on a simple, static neighbor table or automatic neighbor relations table (ANR table) which cell is being referred to. This typically occurs during handover, when a UE moving out of a coverage area of its serving cell will tell its serving cell that it is in an area with strong signal of another cell, the target cell, and the UE requests to be handed over to the target cell by the target cell's PCI.

PCI confusion typically results from the allocation of a single PCI to more than one cell. As the PCI is allocated by the network operator, the network operator is able to control which cells share the same PCI. In some network configurations, a graph coloring algorithm may be used to ensure that no two adjacent cells share the same PCI. However, this may not be sufficient to ensure that a UE will never send a message that could be interpreted as targeting two cells with the same PCI.

In the case that there is PCI confusion, it is possible to positively identify a particular cell using the ECGI request process. In this process, a base station that receives, from a UE, a measurement report with a PCI that ambiguously refers to more than one possible cell can request that the UE request an ECGI from the new cell. ECGIs are unique values that are not reused. Once the ECGI is obtained from the UE, a serving cell can uniquely identify the target cell for receiving the UE handover. However, this process requires additional time and consumes battery power.

In the case of a mobile base station, a simple static ANR table does not provide the same confidence. A fixed base station does not move, and expects its neighbors to remain fixed, and therefore its ANR table does not change. However, a mobile base station moves from place to place, and its neighbors change as it moves, even under the simplifying assumption that none of its neighbors move. An example of a mobile base station is found in U.S. Pat. No. 8,867,418, Mishra et al., "Methods of Incorporating an Ad Hoc Cellular Network Into a Fixed Cellular Network," hereby incorporated by reference in its entirety. An example of an architecture suitable for such a mobile base station is found in U.S. Pat. App. No. 20140133456, Donepudi et al., "Dynamic Multi-Access Network Virtualization," hereby incorporated by reference in its entirety. The example of a mobile base station providing network access to UEs on a mobile vehicle, for example a bus, is used to show how such a mobile base station might track neighbor lists.

The mobile base station has an increased likelihood of encountering a PCI conflict. This is because a fixed macro base station is unlikely to be adjacent to another base station with the same PCI. However, a UE attached to a mobile base station, itself with a particular PCI, will be handed off to another base station upon leaving the coverage area of the mobile base station (e.g., the bus), and depending on the location of the bus, the closest base station may very well have the same PCI as the mobile base station. Additionally, it is possible that a UE connected to the mobile base station may power down in one physical location and power back up in another physical location, encountering by chance two base stations with the same PCI.

Broadly, two approaches are described herein for handling PCI confusion. The first approach is to track base stations not only with PCI, but also in association with the GPS location of the mobile base station at the time a reading is made, and also in association with each base station's global identity or ECGI. The second approach is to perform forking at an intermediate, gateway node in the operator network to cause multiple handover messages to be generated upon a handover request; as a single UE may only be attached to one base station at a time, the base station in the vicinity of the requesting UE is configured to respond and complete the handover.

In the first approach, it is clear that tracking ECGI, in conjunction with or even instead of PCI, is a beneficial approach because ECGI identifiers are unique within the mobile network, so that there is no possibility that two base stations share the same ECGI regardless of location, adjacency to other base stations, or other factors. The LTE standard provides a mechanism for obtaining ECGI. However, the mechanism is expensive in that it requires the following steps: a UE sends a measurement report to a base station for a newly-detected base station with PCI; the base station must request that the UE obtain the ECGI of the new base station; the UE must pass on the request; and the new base station must provide the ECGI, which is lengthy. The information must then be passed back to the requesting base station. These steps each involve latency and require radio power, even viewed in the context of an isolated request. However, in the context of a bus, where tens of people may board or disembark at a single time, the overhead of processing a high volume of requests in a short time makes this approach unwieldy. As well, a bus passes through a large number of base station coverage areas. If a UE is required to obtain the ECGI of every new base station that it sees, even a single UE may be required to be active for a prolonged, battery-draining period.

For these reasons the inventors have contemplated the use of a mobile base station that solves the PCI confusion problem without requiring a large number of ECGI requests. Such a mobile base station would request ECGIs to obtain a full picture of the local neighborhood, without requesting more ECGIs than necessary; and such a mobile base station would be able to retain the information for subsequent use.

One such method is as follows. A mobile base station in a vehicle may be equipped with a GPS receiver and a UE modem. The UE modem may be used to provide wireless backhaul to the mobile base station, as described in U.S. Pat. No. 8,867,418. The UE modem has the advantage of being connected to a power network in the vehicle. The mobile base station may permit UEs on the bus to attach to it, and may provide access to those UEs. Upon receiving neighboring cell measurement reports from the UEs, the mobile base station may track them locally, or may send the neighboring cell reports up to a coordinating node, together with its current GPS location.

In some embodiments, ECGIs may also be stored in this neighbor table. The ECGIs may be associated with the PCI and with the current GPS location to form a 3-tuple. To avoid the impact of multiple requests for ECGIs made at the same time or the battery impact of a single UE performing all requests, ECGIs may be requested: over a period of time; during a test run (e.g., wardriving); by a plugged-in UE modem at the local base station (e.g., the small cell base station located on the bus) only; or from different UEs such that one UE does not perform all the requests. These neighbor relations tables may be shared among buses that run the same route, via the coordinating node, in some embodiments.

Over time, a base station or the coordinating node may build up a neighbor table of PCIs (from the measurement reports) and associated GPS locations. If a full 3-tuple of PCI, GPS, and ECGI is available, the mobile base station or coordinating node may infer in some situations that a given UE requesting a handover means to handout to a particular target base station, even in the situation that multiple base stations have been observed with the same PCI. This is by using the current GPS location of the mobile base station at the time the UE making the handover request to select which ambiguous PCI is intended.

In some embodiments, the position or route of a moving vehicle or mobile base station may be taken into account. For example, if the coordinating gateway is aware of the route and has a priori (e.g., preconfigured) knowledge of the location of the base stations, the coordinating gateway may be able to make a logical inference based on the current position of the mobile base station to identify the nearby base stations. In another alternative embodiment, the speed, known timing and known route of a moving vehicle may be taken into account so that the GPS location of the bus may not be required. In some embodiments, multiple data points, e.g., at different GPS locations or from different UEs may be coalesced into a single data row based on a statistical process at the coordinating node. In some embodiments a timestamp may be combined with GPS or a known route instead of GPS to determine location. In some embodiments, the distance traveled between when a given PCI is first encountered to when the same PCI is encountered again may be used instead of the current GPS location to disambiguate the particular PCI, e.g., disambiguation may be performed without requiring the current position of the vehicle. In some embodiments a "fuzzy search" may be permitted for the GPS coordinates when returning a search value. In some embodiments the velocity of the vehicle may be determined via a connection to the bus or by triangulation, and may be factored in when performing a search for a GPS coordinate.

In some embodiments the ANR table may be maintained at the mobile base station, at the coordinating node, at a macro base station, at all the base stations on the route of the bus, or another place. In some embodiments the ANR table may be shared using the X2 protocol among base stations. In some embodiments the ANR table may be pushed down from the coordinating node. The coordinating node may be a gateway to the core network, in some embodiments, and may perform virtualization of small cells, in some embodiments. The coordinating node may be a Home eNodeB gateway, in some embodiments.

In some embodiments, the ANR table may include additional data, such as SCTP address and port information. The SCTP address and port are used by a source base station to reach the target base station over the network. This information is typically obtained via a request to the Domain Name System (DNS), where a DNS server stores this information in a service (SRV) record. Putting this information in the ANR table can enable the source base station to contact the target base station without accessing DNS, which may be many milliseconds away across the core network. Alternatively, this information may be collected by a mobile base station and used to build up a more complete model of the network.

Figure 1:
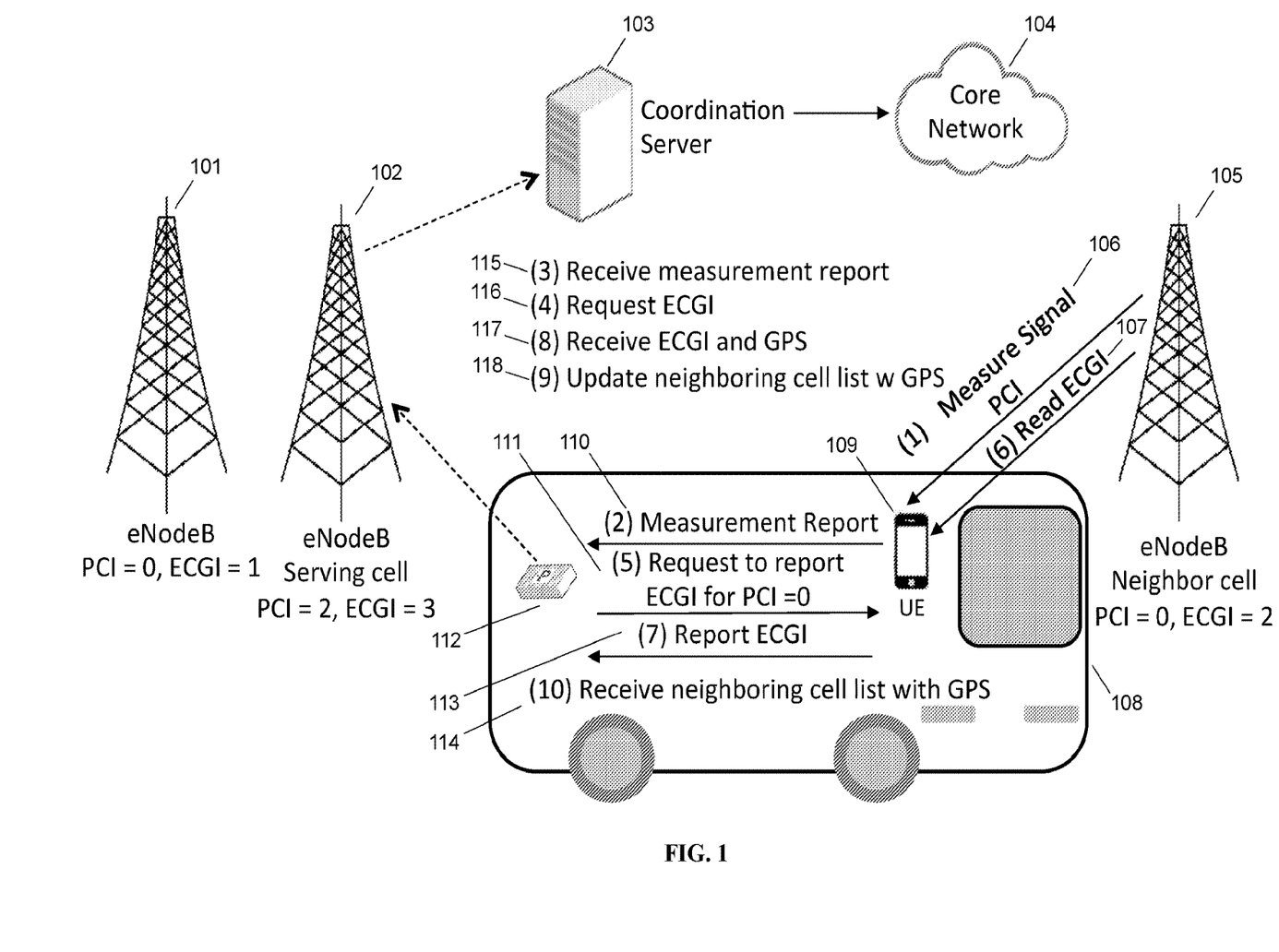
FIG. 1 is a system diagram showing components and steps for providing cell ID disambiguation, in accordance with some embodiments.

FIG. 1 is a system diagram showing components and steps for providing cell ID disambiguation, in accordance with some embodiments. eNodeB 101 is a macro base station with a particular PCI and ECGI, here shown as PCI=0, ECGI=1. eNodeB 102 is another macro base station with PCI=2, ECGI=3, adjacent to eNodeB 101 and having a different PCI. eNodeB 102 is the current serving cell for the UEs and the mobile base station in the diagram. Bus 108 contains mobile base station 112 and UE 109. Mobile base station 112 is an enhanced eNodeB that has a built-in UE for providing wireless backhaul via a connection to eNodeB 102. A dotted line connects mobile base station 112 to eNodeB 102 and to coordination server 103, as this connection is tunneled through a UE connection through macro 102. Coordination server is a gateway providing coordination functions for the RAN and providing a connection to core network 104 for mobile base station 112. UE 109 is attached to mobile base station 112. UE 109 is in proximity to eNodeB 105, which is the neighbor cell in the depicted situation, with PCI=0 and ECGI=2. Although all the nodes have different ECGIs, eNodeB 105 and eNodeB 101 share the same PCI value, 0.

In operation, at step 106 UE 109 detects the presence of base station 105 and measures its signal. At step 110 this is communicated to mobile base station 112 as a UE measurement report. At step 115 this measurement report is forwarded to coordination server 103. At step 116 the coordination server requests the ECGI of eNodeB 105, which request is passed along via mobile base station 112 at step 111, to UE 109 at step 107, which causes the base station's ECGI to be read. At step 113, the UE reports the ECGI to mobile base station 112, which passes it to coordination server 103 at step 117. Mobile base station 112 also reports its GPS location to coordination server 103. At step 118, coordination server 103 updates its neighboring cell list with the GPS coordinates, the PCI value of 0 and the ECGI value of 2. At step 114, the mobile base station receives the downloaded and updated ANR table from coordination server 103. Base station 105 is noted to be a neighbor of mobile base station 112 while mobile base station 112 is at these specific GPS coordinates, and also a neighbor of base station 102.

Various other possible methods of operation are contemplated, such as: maintaining a full or partial ANR list at mobile base station 112; retaining only a portion of all records at mobile base station 112; retaining only a representative selection of all records; coalescing records based on GPS coordinates within a certain radius; and other operations.

Figure 2:
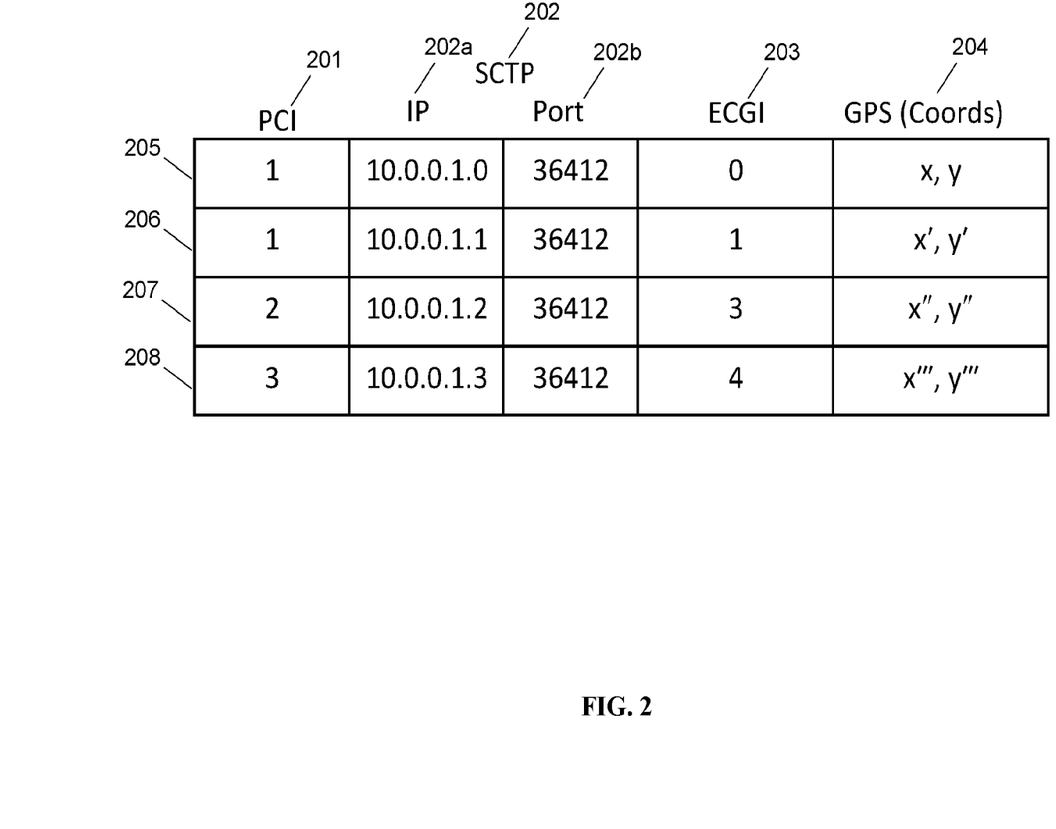
FIG. 2 is an exemplary neighbor table, in accordance with some embodiments.

FIG. 2 is an exemplary neighbor table, in accordance with some embodiments. Column 201 contains PCI data. Column 202 contains stream control transmission protocol (SCTP) data, specifically, an internet protocol (IP) address 202a and a port 202b. The IP addresses listed are private IP addresses corresponding to addresses on the telephone operator's network. The combination of IP and port are used to identify a particular application that is listening for access on the particular port; the port values listed of 36412 are the typical port values for control plane data using the S1AP protocol on the S1 management interface between an eNodeB and a core network, used for handovers; other interfaces such as port 36422, used for the X2AP over the X2 interface for communication between eNodeBs and also used for handovers as well as proprietary information elements, are of course contemplated. The IP and port information shown are sufficient to provide enough information for another base station to initiate a handover; more information could be stored in the table as well.

Column 203 contains the evolved cell global identifier (ECGI). Column 204 contains GPS coordinates, namely, the GPS coordinates of the mobile base station (or the vehicle containing the mobile base station) at the time a measurement was made, which here are represented as a 2-tuple of x and y, but could contain additional information, such as a 3-tuple incorporating elevation, for instance.

The location column 204 could be configured to store fuzzy values, or rounded values, so as to enable a reduction of storage space needed or to enable coalescing of many measurements into a single measurement. The location value could also be used to obtain distances of the bus from each base station. The location value could also be a query to a map. Statistics could be computed over many measurements at the coordination server.

Row 205 is a record of a first base station's PCI, ECGI, SCTP access information, and physical location. Rows 206, 207, and 208 are similarly records of additional base stations. Although values may be the same across rows, such as the PCI values of rows 205 and 206 being the same, it is understood that at least the ECGI will be unique, in most embodiments.

The recordation of the GPS coordinates of the bus enable a query or search for the current coordinates of the bus to bring up all rows that are close to the current location of the bus, e.g., a real-time up-to-date neighbor list for the mobile base station.

A PCI lookup performed by the mobile base station on the subset of records retrieved for the current location of the bus will be advantageously quick, as the number of records will be limited to only those records near the current location. As well, some base stations with the same PCI will likely be excluded. In the event that multiple base stations still share the same PCI, as here with rows 205 and 206, an ECGI may be requested by the base station (to be obtained by the UE by means of a measurement report).

Once a particular PCI identifier is resolved to a particular base station (e.g., row), that base station's ECGI may be used to initiate a connection such as a handover request via the core network, or that base station's IP may be used to contact the base station directly for a more streamlined handover.

Figure 3:
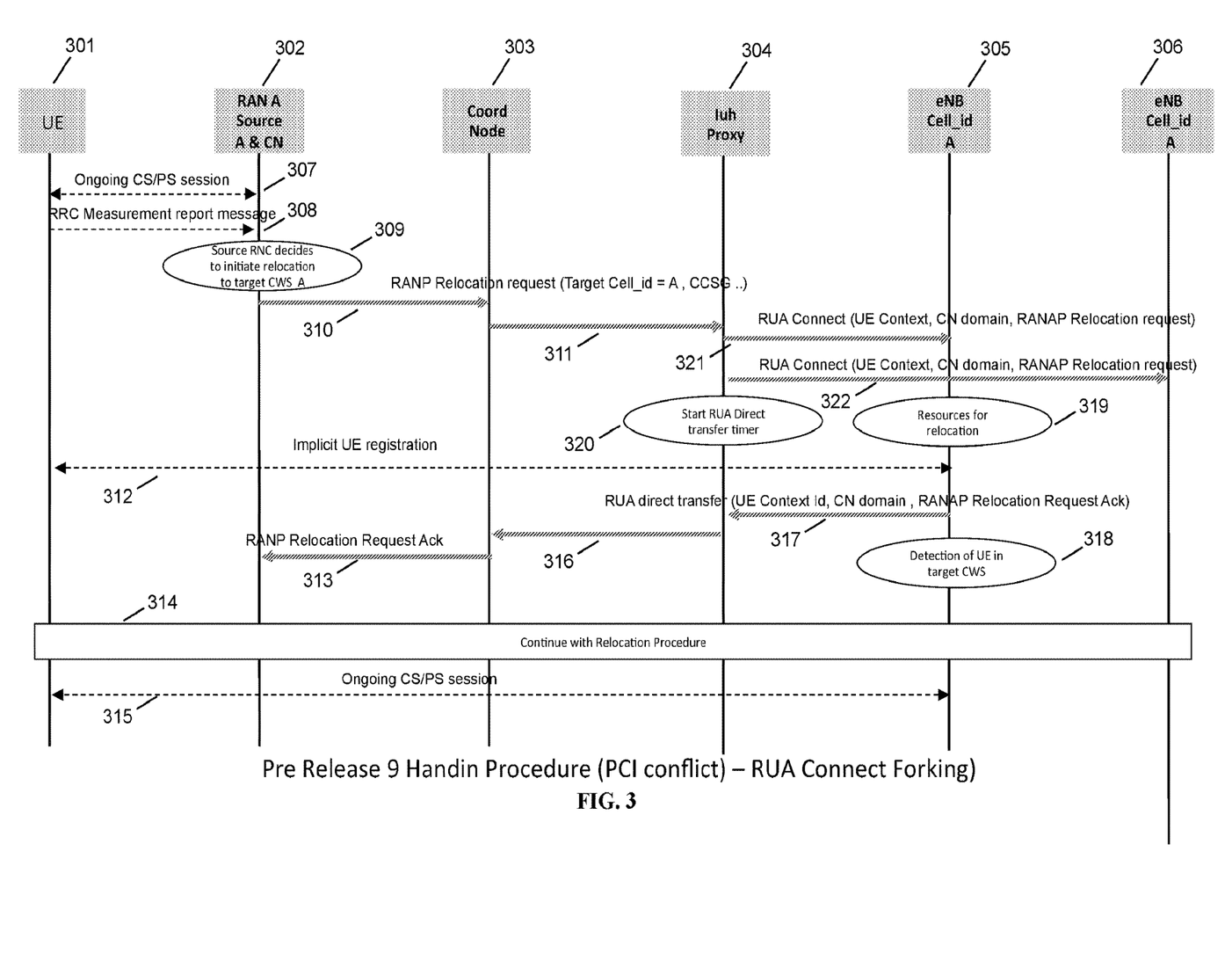
FIG. 3 is a call flow showing a forked handover request, in accordance with some embodiments.

FIG. 3 is a call flow showing a forked handover request, in accordance with some embodiments. In accordance with the second approach described herein, a single handover request may be forked into multiple requests, without adverse effects as only one handover will terminate. Node 301 is a UE attached to RAN A 302, an eNodeB or home eNodeB that is the source RAN. Coordinating node 303 is a gateway acting as a coordinator to the RAN. Iuh Proxy 304 is a node providing access to a core network, such as a Home NodeB gateway. eNodeBs 305 and 306 are two different eNodeBs that share the same cell_id (PCI).

At step 307, the UE has an ongoing circuit or packet switched session with eNB 302. At step 308, the UE detects another base station with PCI or cell_id of "A," and sends a radio resource control (RRC) measurement report to eNB 302 to encourage a handover to eNB "A." At step 309, eNB 302 begins initiating relocation to eNB "A," but it is not clear which eNB is meant, as two eNBs share the cell ID of "A." Without resolving this conflict, at step 310 a relocation request is sent to coordinating node 303 identifying the target cell ID as "A." At step 311, the coordinating node passes this on to the Iuh proxy. Iuh proxy 304 is aware of both eNB 305 and eNB 306, and is able to access both through its access to the core network. Iuh proxy 104 identifies the ECGIs of each of eNB 305 and 306, and fashions a connection message for each with the source eNB's radio access network application part (RANAP) connection request.

Connection message 321 goes to eNB 305. Connection message 322 goes to eNB 306. The UE is located near eNB 305, so the connection message to eNB 306 silently fails. eNB 305 identifies resources for relocation at step 319. In the meantime, Iuh proxy 304 starts a RANAP user adaptation (RUA) direct transfer timer at step 320. At step 312, the home eNodeB gateway (HNB-GW) and eNB 305 perform an implicit registration of the UE, e.g., establishing a context identifier for the UE, to enable the setup of a UE context. This context ID is sent at step 317 from eNB 305 to Iuh proxy 304 (the HNB-GW), which sends it at step 316 to the coordinating node, which sends an acknowledgement message, the RANAP relocation request ack, to the source RAN at step 313, which then performs the final relocation procedure which is referred to by step 314. At the end of the sequence, at step 315, a new session has been established with, and UE 301 is attached to, eNB 305.

Further information regarding the well-known portions of the call flow described herein may be obtained by referring to 3GPP TS 25.467, version 9.5.0 Release 9, hereby incorporated by reference in its entirety for all purposes.

Further embodiments are described below.

1. Fork Handover for Ambiguous PCI HO Request.

In a first embodiment, a handover request may be generated by a user equipment, with a target cell identified by physical cell identity (PCI). However, the user equipment may request to be handed over to a PCI that is in use by more than one cell, such that the network may have more than one choice of which cell to hand the user equipment over to. To solve this problem, the core network may fork the handover request. The original request may be sent from a source eNodeB to a mobility management entity (MME), or in some embodiments, a coordinating node that performs eNodeB or MME aggregation and eNodeB virtualization. The MME/coordinating node may process the handover request, identify that the PCI is in use by more than one eNodeB, and identify each eNodeB referred to by the PCI, for example, with a combination of EUTRAN cell global identifier (ECGI) and PCI. The MME/coordinating node may then fork the request by generating copies of the original handover request, one copy for each eNodeB referred to by the PCI, and may send the copies on to the next processing node in the core network, which may be a target MME or which may be the coordinating node itself, if multiple MMES are being aggregated or virtualized at the coordinating node, or which may be a radio network controller (RNC). Each of the target MMES may then send the forked messages over to each of the multiple target eNodeBs.

Each of the multiple target eNodeBs will receive a handover request message. However, once the messages are received, each of the multiple target eNodeBs will be able to determine whether or not the UE identified in the message by an IMSI or IMEI is in the vicinity of the node. This is because each eNodeB is aware of each UE that is attached to it. If the UE is not in the vicinity of the recipient eNodeB, the messages may then be configured to fail silently, in some embodiments, or may fail with an error sent back to the core network or coordinating node. If the UE is in the vicinity of the recipient eNodeB, the handover request may result in a successful handover. In most cases the recipient eNodeB will only be in the vicinity of a single eNodeB; network design or PCI allocation may be optimized to ensure that this is the case. Therefore, the result of the forked handover will be that one handover request succeeds, and the UE will be handed over to the specific eNodeB that was intended by the UE. In some embodiments a core network may cause all handover requests received after the first handover request to fail, silently or with an error. No additional UE functionality is required, as this failure behavior may be implemented at the eNodeB or within the core network, e.g., at the MME or the coordinating node.

In an alternate embodiment, if the target core network MME or RNC receives a response from multiple base stations within a short time window, the target MME/RNC may request measurement reports from either the UE or the base stations to determine which of the multiple base stations is the true target.

In some embodiments, the handover request may be sent from the source cell to all cells known to the source cell that have that PCI. Two or more handover requests, then, may be created. However, only one handover request will ultimately be met/satisfied, because the receiving cell will determine either that the cell does contain the UE identified in the request and return a handover acknowledgement message, or that the cell does not contain the UE identified in the request and will fail and/or not return a handover acknowledgement message. The handover request may be sent either via X2 or S1, in some embodiments. In some cases, the micro eNodeB may be grouped into a CSG with a 27-bit standard identity.

In some embodiments, forking may occur at the core network, which may include an MME. In some embodiments, forking may occur in the radio access network, for example at the transmitting eNodeB. In some embodiments, it may be possible to perform forking at more than one stage of propagation of the handover request. In some embodiments, PCI lookup may be delayed until the request has been transmitted to a particular node with visibility over a significant subset of the network. For example, each time a handover request is made, the receiving eNodeB and/or MME may forward the request to a central node, or to an MME with a sufficiently populated list of cells, e.g., a list of cells including cells that could conceivably be subject to PCI confusion. The sufficiently populated list of cells is used to perform forking. This has the advantage of postponing PCI disambiguation until PCI confusion has been detected.

This embodiment, with forking performed at the core network, is particularly useful when the current location of a source eNodeB originating the handover request, such as a source eNodeB on a moving vehicle, is not available or when the source eNodeB does not have an extensive neighbor list or automatic neighbor relations (ANR) table.

In another embodiment, if the target core network node receives a response from multiple base stations within a short time window, the target core network node may request measurement reports from either the UE or the base stations to determine which of the multiple base stations is the true target.

In another embodiment, in the event that the UE supports 3GPP Release 9, and the network uses PCI instead of GCI (cell global identity??), prior to handover, one or more core network nodes, such as an RNC, MME or central coordinating node, may store or may have previously stored a list of cell IDs and an indication of geographic location, such as geographic coordinates, for each cell. Upon receiving an initial handover request, the coordinating node may look for an indication of the location of the UE, and/or may request a proximity report from the UE. Once the proximity report is received and/or the location of the UE is determined, the coordinating node may perform a handover based on the handover request and based also on an evaluation of the closest base station to the UE, performing a comparison of the available geographic location information of both the UE and the known locations of base stations in the area.

In another embodiment, when a relocation request is received at a core network node, such as an RNC, MME or central coordinating node, the core network node may send a proximity report (Rel. 9) request back to the UE. The UE may respond with a proximity report indicating if it is in the proximity of one or more cells on a closed subscriber group (CSG) whitelist located at the UE. If the UE responds to the proximity report request the second method may be used. If the UE does not respond to the proximity report request the first method may be used.

In some embodiments, additional information may be used to perform determination of a target base station for handover. Examples of additional information that could be used include: direction and speed of UE travel; signal strength information over time enabling prediction of direction and speed of UE travel; historical information and/or analytics tied to a specific UE's location and/or direction of travel; and/or other predictive information. This information could be collected at the eNodeB, and analyzed either at the eNodeB or at the coordinating node. This information could be aggregated across many eNodeBs.

2. Create ANR Table Using Statically-Configured Coordinates of Tower.

In a second embodiment, an automatic neighbor relations (ANR) table may be created using preconfigured geographic coordinates of each cell base station and stored at a base station. ANR creation may typically be performed dynamically or statically; in the second embodiment the ANR is created using static coordinates. ANR creation is complicated by the fact that a mobile base station operates at multiple locations and therefore an ANR table for such a mobile base station may need to be used at any location. This problem can be simplified by assuming that a mobile base station operates on a fixed trajectory or path, allowing the ANR table to be statically configured for all locations along the fixed trajectory or path. The ANR table is otherwise known as a neighbor relation table (NRT).

As an example, a mobile base station may be affixed to a bus, and may provide access for mobile devices connecting to the base station in the bus. The bus may have a bus route. To statically preconfigure the ANR table for the base station in the bus, the operator may need to describe the geographic coordinates of the bus route, e.g., latitutde/longitude, for example using a global positioning system (GPS) record of the route of the bus or using a map. The operator may also need to identify all neighboring cells along the bus route, using parameters such as the GPS coordinates of each cell; distance of each cell from the bus; transmit power of each cell; antenna directionality of each cell; or other factors. Knowledge of the route of the bus and the cells along the route enables the construction of an ANR table that can be used by the mobile base station at any point along the route.

The ANR table may include the following data elements, in some embodiments: a particular location, expressed in geographic coordinates, for which neighbors are known; and, for each particular location, a list of neighbors. The list of neighbors may be a list including, for each neighbor, at least the PCI of the neighbor, and optionally one or more of the following data elements: a unique identifier for the neighbor within the operator's entire network, which may be an E-UTRAN cell global identifier (ECGI); a power level observed at a particular location; and the location of the neighbor.

The above-described ANR may be used to reduce the likelihood of PCI conflicts, in some embodiments. This is because instead of requiring the mobile base station to search for all cells with a matching PCI along the entire bus route, the mobile base station can restrict its search to only cells that are located nearby the bus at the time the handover request was initiated.

The above-described ANR may also be used to identify a PCI conflict, in some embodiments. For example, a UE connected to the base station in the bus may initiate a handover request, specifying a PCI. The base station could perform a lookup in the ANR table for all neighbors for the particular location of the bus at the time of handover. If more than one neighbor with the same PCI is returned, a PCI conflict is present. By itself, such an ANR cannot, however, be used to disambiguate the PCI conflict. Further information is needed.

3. Create ANR Table Using Dynamically-Configured Coordinates of Tower, from Coordinates of Bus.

In a third embodiment, an automatic neighbor relations (ANR) table may be created dynamically, without using preconfigured geographic coordinates of each cell base station. Assume again that a mobile base station operates on a fixed trajectory or path. However, given intelligence in the base station and in the network, neither the path of the mobile base station, nor the location of cells along the way, need be preconfigured.

With respect to the path of the mobile base station (e.g., the bus route), a mobile base station with GPS can be made to record the GPS location of the bus over a period of time, thereby providing a list of locations constituting the path of the mobile base station. In some embodiments, only repeated locations may be stored, or a list of top locations may be stored, or a list of locations may be stored during an initial auto-configuration period or training period. Further embodiments involving tracking of the location of the bus using GPS are contemplated as equivalent to these scenarios.

With respect to the cells located along the path of the base station's route, the mobile base station may receive measurement reports from UEs attached to the mobile base station, which may be test UEs during a test run, and during that time may accumulate a list of cells along the path to be recorded in an ANR table. This may occur during a training period. The mobile base station may be able to identify each cell along the route with a power level and a recorded PCI, based on UE measurement reports. Each observed cell may be recorded along with its PCI, power level, and the geographic location of its observation. The ANR table may include information as described with reference to other embodiments.

Given enough training data, the mobile base station may be able to triangulate the location of each cell by comparing measured power levels at different locations of the base station. Three measurements of power of a single base station may be enough to identify geographic coordinates of a particular cell. After geographic coordinates of cells are determined, it may be possible for the mobile base station to determine that cells that share the same PCI but that have non-overlapping transmit areas are distinct base stations.

In some embodiments, the second embodiment and third embodiment may be combined to provide an ANR table that is generated through a combination of both static and dynamic means. This can be particularly useful as the dynamic generation method of the third embodiment can be used to keep an ANR table up to date over a period of time.

4. Detect PCI Confusion Based on Coords of Bus. Request ECGI from UE.

In a fourth embodiment, PCI confusion may be detected based on the location of a source mobile base station. Recall that PCI confusion typically results from the allocation of a single PCI to more than one cell. As the PCI is allocated by the network operator, neighboring cells typically do not have the same PCI. However, if a mobile base station moves across cell boundaries, it may enter a region where a specific PCI no longer refers to the same cell identified by an initial handover request. The mobile base station may not be aware that the handover request targeted to a specific PCI is directed to a cell that is different than the originally-intended cell.

As with other embodiments, the network operator may configure the geographic coordinates of each cell before activation of the cell, in some embodiments at the same time as the PCIs are allocated. Note that there are two unknown conditions in the typical scenario: whether PCI confusion exists at all, and if such PCI confusion exists, how the PCI confusion should be resolved. In such cases, the coordinates may be used to determine that there is in fact a PCI conflict or confusion situation.

The coordinates may be latitude and longitude coordinates and/or global positioning system coordinates. For a mobile base station, such as a vehicle-mounted base station, the coordinates of the vehicle may be available from a GPS unit in the vehicle or in the mobile base station itself.

The coordinates of other base stations in the network may be present in the mobile base station itself, such as in an ANR table, and disambiguation may take place in the mobile base station using the vehicle's coordinates. In another embodiment, the coordinates of other base stations may be in the core network, and a request incorporating a PCI such as a handover request may be transmitted with the coordinates of the mobile base station as an additional information element. In another embodiment, the core network may query the mobile base station to obtain the coordinates of the mobile base station if PCI disambiguation is needed.

The coordinates of the mobile base station may be analyzed to determine which base station having the requested PCI is closest to the current location of the mobile base station. In some embodiments, the speed and trajectory of the mobile base station may also be taken into account for determining the cell referred to by the requested PCI. A time window may be provided, so that the signal transmission time is taken into account when determining what base stations were nearby the mobile base station at the time the initial handover request was made.

In some embodiments, the UE may then be requested to provide an ECGI to perform PCI disambiguation. The ECGI is sufficient to disambiguate the PCI conflict. The methods described herein with reference to other embodiments may also be used for performing PCI disambiguation.

5. When Previously-Seen PCI, Request ECGI; Amortize Requests Over All UEs on Bus.

In a fifth embodiment, PCI confusion is enabled to be detected at the mobile base station by creating a detailed neighbor table at the mobile base station. Recall that a base station receives UE measurement reports at intervals, which may include information about neighboring cells and the PCIs of these neighboring cells. The base station is thus able to create a list of neighbors. However, this basic neighbor table is insufficient in the case where the base station is in motion.

A mobile base station is configured to receive UE measurement reports reporting nearby cells. The UE measurement reports will include a PCI for each cell. For each reported nearby cell, the mobile base station may record, in a neighbor table, its own location, as obtained from GPS or another means, and the PCI of the reported cell, and optionally the signal strength and other information contained in the measurement report.

After receiving the measurement report, the mobile base station will also optionally request that the reporting UE perform additional steps to obtain an E-UTRAN cell global identity (ECGI), and send the ECGI to the mobile base station. The mobile base station may request ECGIs for some or all reported cells. The mobile base station may have multiple UEs attached, each sending measurement reports; in some embodiments the mobile base station may request ECGIs from some or all UEs. The ECGIs are then recorded in the neighbor table for the specific PCI and location.

In some embodiments the ECGI request procedure may be amortized over multiple UEs. For example, all UEs in the same physical location will typically report measurements from the same list of neighboring cells. Instead of requiring all UEs to obtain and send ECGIs for each of the neighboring cells, the mobile base station may request that each UE request only one, or a subset of, the ECGIs for the entire cell neighbor list. When multiple UEs are connected, this technique enables UE power savings over requiring all UEs to obtain ECGIs, while still obtaining an ECGI for each neighboring cell, increasing battery life for the UEs.

Since the ECGI is recorded in the neighbor table, on subsequent handover requests which involve a PCI, the mobile base station may check to see if the PCI exists in the neighbor table, and if the PCI exists, may then check to see if multiple ECGIs exist for that PCI. If multiple ECGIs exist, a PCI conflict can be determined to exist.

In some embodiments, a UE may be requested to identify a handover target via ECGI as well as PCI.

6. When Previously-Seen PCI, Request ECGI Using UE Modem in CWS.

In a sixth embodiment, being a variant of the fifth embodiment, the mobile base station may incorporate an internally- or externally-connected UE modem, used for example for backhaul. In this embodiment all ECGI requests may be performed by the mobile base station itself using this connected UE modem. This has the advantage of saving battery life for connected UEs, as the mobile base station's UE modem will typically not be as power-constrained as a cell phone user's UE. The UE modem may be coupled to the mobile base station via a USB port. Since user UEs are not used, battery life for all users is improved.

In some embodiments, an ECGI may be requested only for PCIs that have previously been stored at the mobile base station.

7. See Cell Site, Use UE Modem in CWS, Request ECGI Each Time.

In a seventh embodiment, a neighbor table may be created using a UE modem in the mobile base station. This approach uses the UE modem in the mobile base station to reduce the need to use measurement reports from attached UEs. The UE modem may be directed to actively search for nearby cells and provide information about the nearby cell to the mobile base station. The UE modem may be directed to request ECGI information for every cell that it comes into contact with, which enables the mobile base station to record both a PCI and an ECGI for each detected cell.

8. Self-Learning Neighbor Table. Gradually Create a Master List Over Time.

In an eighth embodiment, a complete neighbor table is created over time at the mobile base station. The mobile base station may use any of the methods described above to obtain information about neighboring cells, including collecting UE measurement reports. Once information is received about neighboring cells, the information may be tagged with the current geographic location of the mobile base station and stored in a table. The table may contain ECGIs; the ECGIs may be obtained from UEs or from a UE modem at the mobile base station. The information may be collected without substantial input from the core network.

In some embodiments, using GPS location, smaller dynamic neighbor tables may be created from the master table. As the vehicle moves the smaller table may be dynamically updated. This smaller table will be used for Handovers.

The mobile base station may be mounted in a vehicle, and the vehicle may traverse an area. Over a longer period of time, if the vehicle traverses the same area multiple times, the mobile base station may be able to automatically identify each cell in the area. For example, if a mobile base station is mounted in a bus with a fixed bus route, the mobile base station may be able to identify every cell along the bus route based on UE measurement reports. The cell information may be tracked in a neighbor table at the mobile base station.

When cell coverage changes along the bus route, the mobile base station may pick up the change and enter it into the neighbor table. This may be enabled by periodically re-entering a training mode at specific times or intervals, or re-entering the training mode upon receiving previously-unseen PCIs from UEs or from the base station's connected UE modem.

In some embodiments, ECGIs may be requested and tracked. In some embodiments, an estimate for the location of each cell may be calculated using a process that executes at the mobile base station, using the location of a UE measurement, the increase and decrease of base station received signal power, or both. In some embodiments, individual UE measurement reports may be tracked and saved at the base station.

When a handover is requested, the mobile base station may be able to detect potential PCI confusion by searching the neighbor table for the same PCI appearing in more than one geographic location, or for a single PCI appearing in the table with a plurality of ECGIs. The mobile base station may also be able to predict, based on the location of the mobile base station at the time handover is requested, the direction of travel of the mobile base station, or both, which cell is the desired cell for handover, even if multiple cells share the same PCI.

In some embodiments, this master neighbor table may be created by each mobile base station. In other embodiments, a single base station may create the table and then share it with other base stations or a core network control node. In some embodiments, where the table is shared, each base station using the table may contribute changes to the table, which may be mediated by the central control node in the core network.

9. On LAC, use neighbor table from CWS, but also track SCTP IP and port. Get SCTP IP via first S1 handover. Extend S1 protocol to request port as well as IP. This allows X2 handover with zero configuration.

In a ninth embodiment, a neighbor table is enhanced to allow for enhanced handover between cells. In some embodiments, handovers may be enabled between a source cell and a target cell. Handovers may result as a result of an S1-protocol communication from the core network, an X2-protocol communication between cells, or both. Handovers typically include a mechanism for data to be passed from the source cell to the target cell during the intermediate period between the initiation of the handover and the establishment of UE communications at the target cell, during which data may be sent to the source cell that is no longer connected to the UE. This function is typically performed by a forwarding tunnel.

In some embodiments, a neighbor table may be constructed, either at the core network or at a mobile base station. The neighbor table may include cell PCIs, and may facilitate PCI confusion detection or PCI disambiguation or both, as further described above. The neighbor table may be augmented to include two elements: an IP address and a port, both being used for communicating via the stream control transmission protocol (SCTP) for a particular cell. This enables X2 handover without manual configuration.

In some embodiments, this SCTP information, e.g., the IP address and port, may be requested by a coordination server or mobility management entity (MME) performing handover facilitation, or by another node performing handover facilitation, where this node uses the S1 protocol to facilitate handover. The S1 protocol may be extended to request the IP address and port, and the coordination server and base station may be extended to provide the IP address and port upon request. An S1 message may be sent from the handover facilitation node to the base station requesting the IP address and port. Subsequent handovers that are performed via the handover facilitation node may use the IP address and port to reduce the time needed to establish a forwarding tunnel. The IP address and port information are called SCTP information in the following discussion.

As an example, a source cell and a target cell are coupled via different backhaul connections to two different MMEs. The source node is a mobile base station and the target cell is a macro cell, each extended to provide SCTP information upon request. The source node has an enhanced neighbor table as described above. A UE requests a handover from the source cell to the target cell. The handover request results in the source cell optionally performing PCI confusion detection, and also results in the source cell identifying the target cell as the target, based on PCI information in the request. The source cell then sends a handover request message to its MME to identify the target MME and target cell. The source MME sends an enhanced S1 message requesting SCTP information, as part of its S1 communication to the target MME. The source MME then sends the SCTP information to the source cell as part of a neighbor table update. The remaining parts of the handover may continue normally, including X2 forwarding of data from the source cell to the target cell.

Now that the source cell has SCTP information about the target cell in its neighbor table, when a second UE requests a handover from the source cell to the target cell, the source cell may initiate a direct X2 handover by sending an X2 message to the target cell using the SCTP information.

In some embodiments, a domain name system (DNS) service (SRV) record could be changed at a DNS server in the core network to reflect the SCTP information in the neighbor table.

10. PCI Allocation

In a tenth embodiment, a method for allocating physical cell identifiers (PCIs) is described. A centralized entity or coordinating node, which may be a Parallel Wireless LTE access controller (LAC), may prepare an active set of neighbor sites. The active set may have all neighboring PCIs, including indoor, macro, neighbor of macro, small cell base stations, including those under and not under the management of the centralized entity, CSGs, etc. Based on the active set, PCIs may be allocated, either at the centralized entity or elsewhere. In some embodiments, the active set may include, or allocation of PCIs may incorporate, multiple inputs, such as GPS coordinates, neighbor lists of some or all transmitters around a base station, UE measurements, handover statistics (weighting, rate of success, etc.), and overshooting cells or cells that may be visible to more than one small cell/base station. Overshooting cells, also called boomer cells, may cause PCI allocation confusion as they are visible from more than one base station. Timing advance commands and GPS coordinates may be used to perform PCI allocation to avoid the re-use of a PCI used by a boomer cell.

As another example of the third embodiment, given a dense environment in which only a small number of PCIs are available for allocation, and a single frequency band of 2.3 GHz is intended for use for a dense heterogeneous network of 5×5 kilometers square, supporting several thousand small cells, some indoor and some outdoor, with interference among the cells, the PCI allocation environment is complex. To help allocate PCIs effectively, clusters may be identified based on handover patterns (weightage/attempts), UE measurements such as indoor leakage, distance from the small cells to the macro cell (or from each other), GPS coordinates, closed subscriber group, X2 neighbor communications, and outdoor/indoor characteristics. Each cluster may be assigned individual PCIs and neighbor lists, which can be an active set or a cluster's neighbor list. All cells in a configurable radius may have all the PCIs as dummy neighbors, to ensure that the same PCI is not allocated. For cells further away than distance D, or (number of allocable PCIs) mod 3, mod 6, and/or mod 30, whichever is greater, PCI duplication may occur. In some embodiments, boomer cells may be identified by timing advance counters and/or excluded. Macro cells may be taken into account when allocating PCIs, such that conflicts will be detected and resolved.

11. PCI Dynamic Neighbor List

In an eleventh embodiment, systems and methods for a dynamic neighbor list based on search zones suitable for a mobile vehicle are described. One-way neighbor addition may also be enabled. In some embodiments, a base station, such as an eNodeB, may be fitted in a moving bus. As the bus moves along the route, it moves closer to and further from other base stations, which may be macro base stations. To provide service to users on the bus. Reference transmit power may be dynamically controlled so that cell area is confined to the bus only and does not include area outside the bus, so as not to cause service disruptions for users outside the bus, such as people standing outside the bus or people within another nearby bus located at a bus depot.

As the bus moves, the base station may be configured with a neighbor table at geographic intervals of approximately 100 to 300 meters, or another distance, as appropriate. The bus location and distance may be determined by GPS or another means. The neighbor table may be created on the bus or at a centralized node, such as in a self-organizing network (SON) module, in some embodiments. The base station installed in the bus may report neighbor cells, their PCIs, neighbor cells' RSRPs reported by UEs, and neighbor cells' RSRQs reported by UEs, and may report this information to a centralized node, in some embodiments.

In some embodiments, LTE UEs may be solicited to collect, or may be passively subject to collection from, serving cell RSRP, and/or tracking area, pathless, cell center and cell edge status. In some embodiments, LTE UEs may also be subject to collection of information regarding handovers, including information about the location of handovers, and PCIs of handover target cells.

In some embodiments, the SON module in the centralized node may maintain a history of several days' worth, such that SON will attempt to determine the appropriate PCI given any PCI request situation, including PCI conflict or PCI confusion situations. The SON may continue to refine its results based on GPS measurements. UE GPS measurements and/or base station GPS measurements may also be tracked by the SON module, in some embodiments. The method thus described could be used as appropriate on any other type of moving vehicle, such as a car, plane, boat, train, airship, balloon, or other conveyance.

12. X2 Communication Among Strategically Placed BSSes

In a twelfth embodiment, the network operator may place small cells and/or base stations in strategic locations so as to cover an area around a macro cell. For example, in a macro underlay situation, the area under a macro cell may be covered. Some small cells may be placed near a cell edge, some close to the cell center, and some close to the middle of the cell range. A number of cells around 16 cells may be used, in some embodiments. Roughly equal geographic coverage may be used, in some embodiments. The small cells may communicate with each other via, for example, an X2 protocol. The small cells may send to each other signal characteristics of the macro cell, as well as information regarding PCIs observed of neighboring cells. Based on signal quality measures, such as serving cell RSRP, and observed PCIs, and a geographic mapping of each small cell relative to the others, a central coordination server or a distributed process involving all the small cells may be able to identify whether a single PCI is being reused, where the PCI is being used, and other information about neighboring cells in the area, which may then be shared with other cells, including the small cells in the group of small cells.

Figure 4:
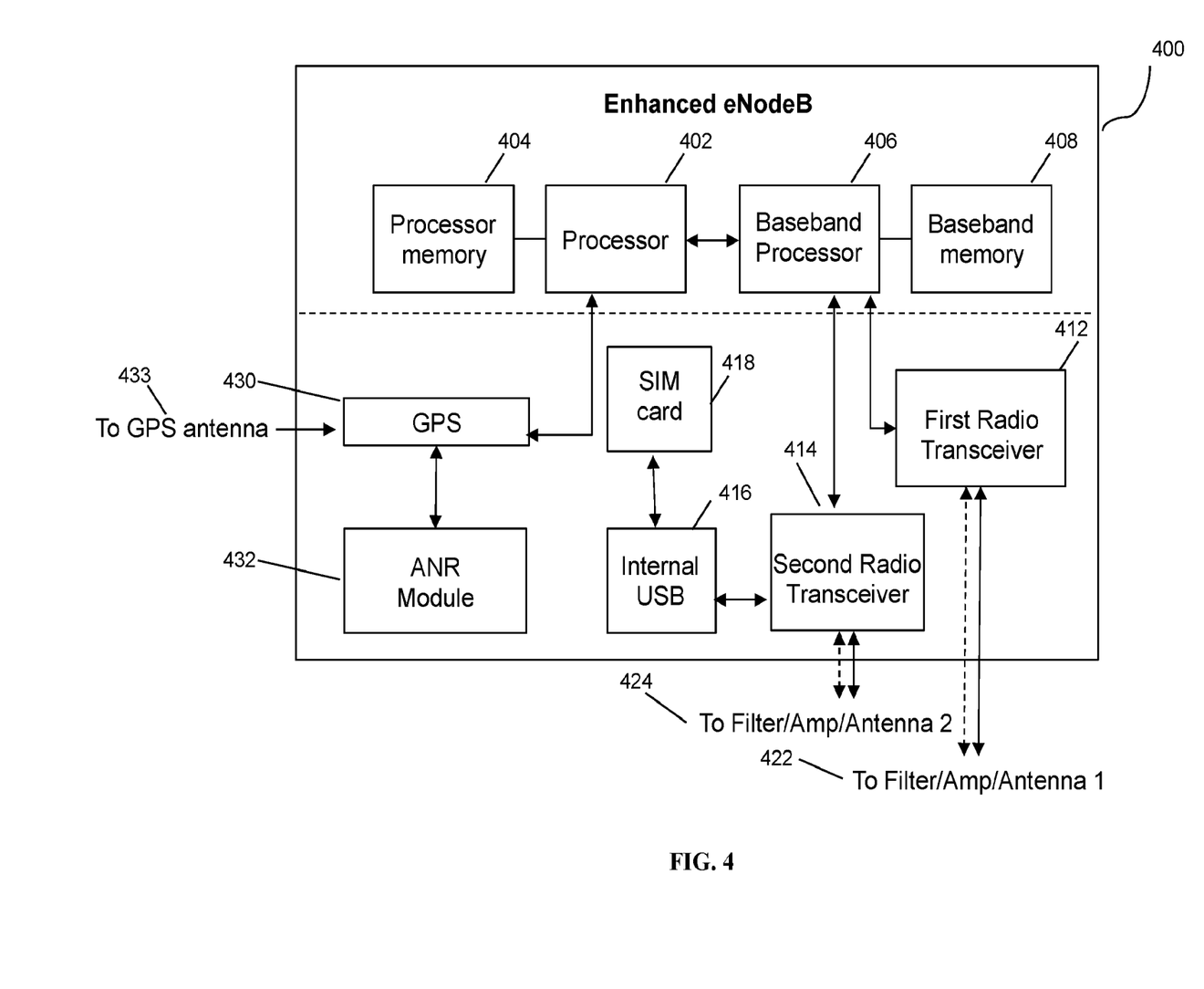
FIG. 4 is an enhanced eNodeB for performing the methods described herein, in accordance with some embodiments.

FIG. 4 is an enhanced eNodeB for performing the methods described herein, in accordance with some embodiments. Mesh network node 400 may include processor 402, processor memory 404 in communication with the processor, baseband processor 406, and baseband processor memory 408 in communication with the baseband processor. Mesh network node 400 may also include first radio transceiver 412 and second radio transceiver 414, internal universal serial bus (USB) port 416, and subscriber information module card (SIM card) 418 coupled to USB port 416. In some embodiments, the second radio transceiver 414 itself may be coupled to USB port 416, and communications from the baseband processor may be passed through USB port 416. The second radio transceiver may be used for wirelessly backhauling eNodeB 400.

Processor 402 and baseband processor 406 are in communication with one another. Processor 402 may perform routing functions, and may determine if/when a switch in network configuration is needed. Baseband processor 406 may generate and receive radio signals for both radio transceivers 412 and 414, based on instructions from processor 402. In some embodiments, processors 402 and 406 may be on the same physical logic board. In other embodiments, they may be on separate logic boards.

Processor 402 may identify the appropriate network configuration, and may perform routing of packets from one network interface to another accordingly. Processor 402 may use memory 404, in particular to store a routing table to be used for routing packets. Baseband processor 406 may perform operations to generate the radio frequency signals for transmission or retransmission by both transceivers 410 and 412. Baseband processor 406 may also perform operations to decode signals received by transceivers 412 and 414. Baseband processor 406 may use memory 408 to perform these tasks.

The first radio transceiver 412 may be a radio transceiver capable of providing LTE eNodeB functionality, and may be capable of higher power and multi-channel OFDMA. The second radio transceiver 414 may be a radio transceiver capable of providing LTE UE functionality. Both transceivers 412 and 414 may be capable of receiving and transmitting on one or more LTE bands. In some embodiments, either or both of transceivers 412 and 414 may be capable of providing both LTE eNodeB and LTE UE functionality. Transceiver 412 may be coupled to processor 402 via a Peripheral Component Interconnect-Express (PCI-E) bus, and/or via a daughtercard. As transceiver 414 is for providing LTE UE functionality, in effect emulating a user equipment, it may be connected via the same or different PCI-E bus, or by a USB bus, and may also be coupled to SIM card 418. First transceiver 412 may be coupled to first radio frequency (RF) chain (filter, amplifier, antenna) 422, and second transceiver 414 may be coupled to second RF chain (filter, amplifier, antenna) 424.

SIM card 418 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 412 and 414, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 402 for reconfiguration.

A GPS module 430 may also be included, and may be in communication with a GPS antenna 432 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 432 may also be present and may run on processor 402 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 5:
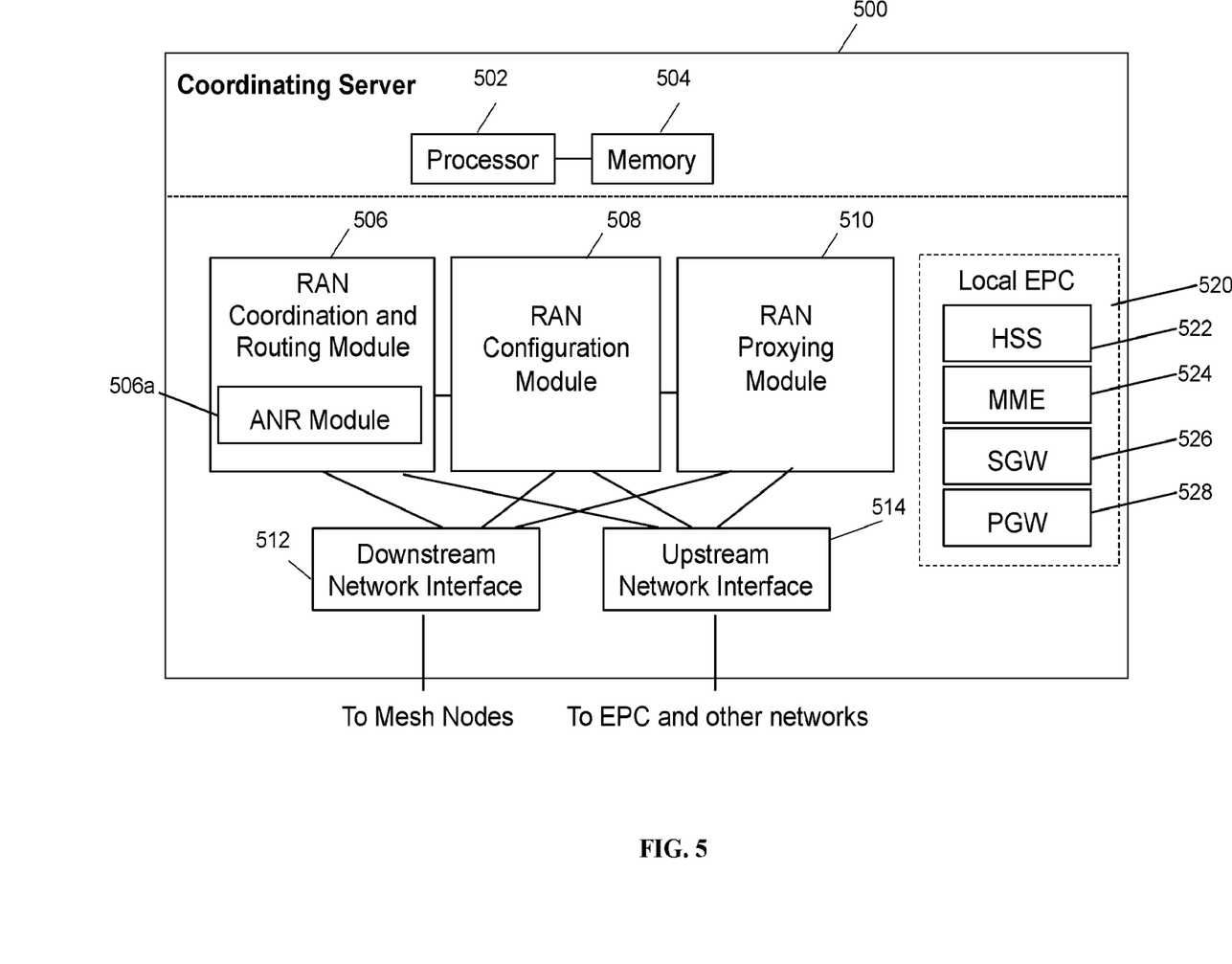
FIG. 5 is a coordinating server for providing services and performing methods as described herein, in accordance with some embodiments.

FIG. 5 is a coordinating server for providing services and performing methods as described herein, in accordance with some embodiments. Coordinating server 500 includes processor 502 and memory 504, which are configured to provide the functions described herein. Also present are radio access network coordination/routing (RAN Coordination and routing) module 506, including ANR module 506a, RAN configuration module 508, and RAN proxying module 510. The ANR module 506a may perform the ANR tracking, PCI disambiguation, ECGI requesting, and GPS coalescing and tracking as described herein, in coordination with RAN coordination module 506 (e.g., for requesting ECGIs, etc.). In some embodiments, coordinating server 500 may coordinate multiple RANs using coordination module 506. In some embodiments, coordination server may also provide proxying, routing virtualization and RAN virtualization, via modules 510 and 508. In some embodiments, a downstream network interface 512 is provided for interfacing with the RANs, which may be a radio interface (e.g., LTE), and an upstream network interface 514 is provided for interfacing with the core network, which may be either a radio interface (e.g., LTE) or a wired interface (e.g., Ethernet).

Coordinator 500 includes local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Modules 506, 508, 510 and local EPC 520 may each run on processor 502 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for forking a handover request, comprising:
receiving, by a coordinating node performing eNodeB or MME aggregation, a handover request from a source base station;
processing the handover request;
determining that a target handover cell in the handover request is in use by a plurality of base stations;
generating copies of the handover request;
sending one copy of the request to a next processing node in a core network, wherein the next processing node is a target MME or the coordinating node,
sending, by the next processing node in the core network, one copy of the request to each of the plurality of base stations identifying the target handover cell in the handover request;
determining, by each base station receiving a copy of the request, whether a User Equipment (UE) identified in the request is in a vicinity of the next processing node; and when the UE is in the vicinity of the next processing node, executing the handover request.

2. The method of claim 1, wherein the source base station is a source eNodeB; the target handover cell is identified using a Physical Cell Identity (PCI); and the plurality of base stations is a plurality of eNodeBs.

3. The method of claim 2, wherein when the UE is not in the vicinity of the next processing node, then the handover request fails and an error message is sent.

4. The method of claim 2, wherein when the UE is not in the vicinity of the next processing node, then the handover request fails silently.

5. The method of claim 2, wherein the determining that a PCI in the handover request is in use by a plurality of eNodeBs includes using a combination of Evolved Terrestrial Radio Access Network (EUTRAN) cell global identifier and the PCI.

6. The method of claim 2, wherein the receiving a handover request from a source eNodeB is performed by a Mobility Management Entity (MME).

7. The method of claim 2, wherein the determining, by each eNodeB receiving a copy of the request, whether a User Equipment (UE) identified in the request is in a vicinity of the next processing node is identified by an International Mobile Equipment Identity (IMEI).

8. The method of claim 2, wherein the determining, by each eNodeB receiving a copy of the request, whether a User Equipment (UE) identified in the request is in a vicinity of the next processing node is identified by an International Mobile Subscriber Identity (IMSI).

9. The method of claim 2, further comprising optimizing PCI allocation wherein a recipient eNodeB will only be in the vicinity of a single eNodeB.

10. The method of claim 2, further comprising failing all handover requests received after a first handover request fails.

* * * * *